United States Patent [19]

Rorvig

[11] Patent Number: 5,181,259
[45] Date of Patent: Jan. 19, 1993

[54] GENERAL METHOD OF PATTERN CLASSIFICATION USING THE TWO DOMAIN THEORY

[75] Inventor: Mark E. Rorvig, Houston, Tex.

[73] Assignee: The United States of America as represented by the Administrator of the National Aeronautics and Space Administration, Washington, D.C.

[21] Appl. No.: 587,922

[22] Filed: Sep. 25, 1990

[51] Int. Cl.⁵ .............................................. G06K 9/00
[52] U.S. Cl. .......................................... 382/36; 382/1; 382/6
[58] Field of Search ...................... 382/6, 30, 18, 1, 36; 364/715, 413.08, 413.17, 413.18

[56] References Cited

U.S. PATENT DOCUMENTS

| | | | |
|---|---|---|---|
| 4,129,854 | 12/1978 | Suzuki et al. | 382/6 |
| 4,307,376 | 12/1981 | Miller et al. | 382/6 |
| 4,326,259 | 4/1982 | Cooper et al. | 364/715 |
| 4,618,988 | 10/1986 | Schiller | 382/5 |
| 4,850,024 | 7/1989 | Motoike et al. | 382/6 |

OTHER PUBLICATIONS

"The Two Domain Theory of Image Collection Searching," Project Icon Working Paper No. 86-1, M. E. Rorvig, Project ICON Image Scaling Laboratory, The University of Texas at Austin, Austin, TX 1986.
"Automatic Image Classification by Psychometric Mapping," Technical Report No. 87-2, M. E. Rorvig, R. Helfer & S. Fitzpatrick, Project ICON Image Scaling Laboratory, The University of Texas at Austin, Austin, TX 1987.

Primary Examiner—Michael T. Razavi
Assistant Examiner—Yon Jung
Attorney, Agent, or Firm—Hardie R. Barr; Guy M. Miller; Edward K. Fein

[57] ABSTRACT

Human beings judge patterns (such as images) by complex mental processes, some of which may not be known, while computing machines extract features. By representing the human judgements with simple measurements and reducing them and the machine extracted features to a common metric space and fitting them by regression, the judgements of human experts rendered on a sample of patterns may be imposed on a pattern population to provide automatic classification.

19 Claims, 5 Drawing Sheets

■ SET A: 1-4: SUBJECT 1
□ SET A: 5-8: SUBJECT 2

FIG.3

FIG.4
■ SET A:1-4.9-12: SUBJECT 1
□ SET A:5-8.13-16: SUBJECT 2

FIG.5
● SET B:17-20.25-28 SUBJECT 1
○ SET B:21-24.29-32 SUBJECT 2

FIG.6

- ■ SET A: 1-4, 9-12; SUBJECT 1
- □ SET A: 5-8, 13-16; SUBJECT 2
- ● SET B: 17-20, 25-28; SUBJECT 1
- ○ SET B: 21-24, 29-32; SUBJECT 2

FIG.7

- ■ SET A: 1-4, 9-12; SUBJECT 1
- □ SET A: 5-8, 13-16; SUBJECT 2
- ● SET B: 17-20, 25-28; SUBJECT 1
- ○ SET B: 21-24, 29-32; SUBJECT 2

GENERAL METHOD OF PATTERN CLASSIFICATION USING THE TWO DOMAIN THEORY

ORIGIN OF THE INVENTION

The invention described herein was made by an employee of the U.S. Government and may be manufactured and used by or for the Government of the United States of America for governmental purposes without the payment of any royalties thereon or therefor.

BACKGROUND OF THE INVENTION

The present invention relates to a method for automatic classification of a collection of patterns which uses the judgments of human experts on a plurality of sample patterns to organize the collection into sets of similar patterns.

More particularly, the present invention relates to a method for the automatic classification of a collection of patterns, such as image patterns, which uses the so-called "Two Domain Theory" of pattern classification.

Pattern classification by computational devices is usually approached in two phases. The first, a so-called "training" phase is the specification by an expert of pattern exemplars representing the classes as a training set. In the subsequent, so-called "classification phase" pattern features extracted from the target pattern population are joined with the features similarly extracted from the specified exemplars. Various difficulties arise with these techniques in both phases. For example, in the training phase, the expert's knowledge must be properly decoded to record accurately the salient features used for exemplar classification: a process of recognized difficulty with many pitfalls. Additionally, in the classification phase, information from the expert must often be encoded as specific programs for identification and matching, thus restricting the applicable domain of the algorithm. Even the most robust of these methods, the Fisher linear discriminant, where neither the features of the exemplar nor the domain features of the target population of images need be exactly specified, suffers from the noise introduced in exemplars when the expert makes judgments on only a few features of a multi-featured pattern.

SUMMARY OF THE INVENTION

The principal object of the present invention is to provide a method of pattern classification which requires neither explicit decoding of expert judgments nor domain specific feature matching and which, further, removes from consideration the noise introduced in the Fisher method.

This object, as well as further objects which will become apparent from the discussion that follows, are achieved, according to the present invention, by providing a method, hereinafter called the "Two Domain Method", that introduces two unique processes in both the training and classification phases. First, expert knowledge is acquired through multi-dimensional scaling of judgments of dissimilarities rendered by a human expert on a sample of patterns from the target population. Second, general pattern features extracted from the pattern of the target population are transformed to points in a Euclidean space. With this method, the problem of pattern classification is reduced from the complex one of creating machine based validity rules to the simple matter of creating a linear mapping between two datasets derived from the human domain and the machine domain, respectively.

More specifically, the Two Domain Method according to the present invention comprises the steps of:

(a) selecting a set of sample patterns, preferably by random selection from the collection C of the patterns which are to be classified;

(b) manually comparing members of the set of sample patterns to determine the degree of dissimilarity of each member of the set with respect to some, and preferably all, other members of the set;

(c) producing an ordering $\Phi$ of the members of the set by their degree of dissimilarity, preferably by multi-dimensional scaling;

(d) sensing the collection C of patterns to produce a signal S representing the patterns, for example by digitization;

(e) processing the signal S to produce a plurality of signatures representing distributions of primitive features of interest;

(f) calculating the spacial distance among pairs of the patterns from the signatures to produce a matrix M of interpoint distances; and (g) creating a mapping of the ordering $\Phi$ on the matrix M by multiple regression.

By means of this method, the collection C of patterns is organized into sets of similar patterns using the judgments of human experts on the set of sample patterns.

According to a preferred embodiment of the invention, the comparing step, referred to above, includes the steps of manually marking a line, for each pair of sample patterns, which indicates on an arbitrary scale, from dissimilar to similar, the degree of similarity of each pair, and then sensing the line to produce a signal representative of the position of the mark on the line.

According to another preferred embodiment of the invention, the step of processing the signal S includes the steps of producing a histogram for each of the primitive features and then converting the feature histograms for each pattern into Lorenz information measures.

The calculating step thus preferably includes the step of calculating the Euclidean distance among pairs of the patterns over the Lorenz information measures to produce the matrix M.

According to another preferred embodiment of the invention, the step of creating a mapping includes the step of creating a linear mapping of the ordering $\Phi$ on a matrix M by regressing the ordering $\Phi$ with the sample of matrix M corresponding to the sample manually compared to obtain a matrix of weights $\beta$ by multiple regression and multiplying the matrix M by the matrix $\beta$. Thereafter, the results of the matrix multiplication are submitted to multi-dimensional scaling to produce the final ordering $\Phi'$, consisting of patterns segregated into classes in an n-dimensional space.

As used herein, the term "multi-dimensional scaling" refers to a technique described by F. W. Young and R. M. Hamer in *MultiDimensional Scaling: History, Theory and Applications*, Lawrence Erlbaum Associates, Publishers; Hillsdale, N.Y. and London (1987). The term "multi-dimensional scaling" refers to a family of data analysis methods, all of which portray the data structure in a spatial fashion easily assimulated by the relatively untrained human eye. They construct a geometric representation of the data, usually in a Euclidean space of fairly low dimensionality. The essential ingredient found in all multi-dimensional scaling methods is the spatial representation of data structure.

Whereas in unidimensional measurement, an attribute corresponds to the straight line (a unidimensional space), and the quantity of this attribute to a point on the line, in multi-dimensional scaling, the attribute corresponds to an n-dimensional space, and the quantity to a point in that space. Whereas the process of assigning numbers in unidimensional measurement corresponds to the location of points on a line, in terms of the order of points, their distance from one another, and/or their distances from an origin, so, in multi-dimensional scaling, the process of assigning numbers corresponds to locating the points in a multidimensional space, in terms of a set of relations between the points as specified by the particular geometrical model.

By way of explanation of the Two Domain Method, consider a collection of patterns (in this case, images) denoted "C". Let the goal of the expert be to define pairwise dissimilarities among a sample set of these images chosen by a random process. These dissimilarities judgments may be collected by presenting all possible pairs of the images in the sample and asking the expert to place a mark on a line labeled "dissimilar" at one end and "similar" at the other. A ruler applied to these lines thus establishes a matrix of dissimilarity values among the sampled images. By processing these judgments in an n-dimensional space using conventional multi-dimensional scaling (MDS) techniques, a unique, real-valued ordering of these images by their dissimilarity may be produced. Let this ordering be denoted $\Phi$. With this procedure it becomes unnecessary to know explicitly the portions, features, or aspects of the image, or even the deductive rules used by the expert, in rendering the judgments. Whatever features, aspects, or rules the expert may have attended to or employed are already implicit in the ordering, $\Phi$.

Considering again the collection C, let it be assumed that each image in this collection has been digitized and processed so as to extract a number of general, primitive features rendered as histograms. In the example given below, six features are extracted: grey level, edge intensity, edge slope, line length, line distance from the origin, and angle distance from the origin. These features are not the only possible features that might be used, or even the optimal features, but are used as examples because they are very general and convenient.

By converting the histograms for each image into Lorenz information measures, and calculating the Euclidean distance among all pairs of images over all feature measures, a matrix, denoted M, of primitive machine image interpretations may be produced. In this manner, the complex problem of image classification is reduced to the far simpler one of creating a linear mapping of $\Phi$ on M.

In the present method, the mapping is performed by extracting from C the original machine measures matching the subset of C judged by the human expert, calculating Euclidean distances for both machine measurements and human coordinates, deriving weights, $\beta$, by multiple regression (where the Euclidean distances from the MDS solution for the human judgments are the dependent variable and the Euclidean distances among images based on machine measurements are the independent variables), and multiplying M by $\beta$. By resubmitting the predicted values to the multidimensional scaling process, the final ordering is produced, consisting of patterns segregated into classes in an n-dimensional space. This last result is denoted as $\Phi'$.

The preferred embodiments of the invention will now be described with the aid of the accompanying drawings.

BRIEF DESCRIPTION OF THE DRAWINGS

FIGS. 8 and 9 are MDS ALSCAL plots (in numbered display) of both primitive and human weighted views of all 32 peripheral blood cell slides, corresponding to the datapoints shown in FIGS. 6 and 7, respectively. FIG. 9 exhibits the substantial "learning" effect created by imposition of human judgments on machine interpretations.

DESCRIPTION OF THE PREFERRED EMBODIMENTS

The preferred embodiments of the present invention will now be described with reference to FIGS. 1-9 of the drawings.

The Two Domain Method

Figure 1:
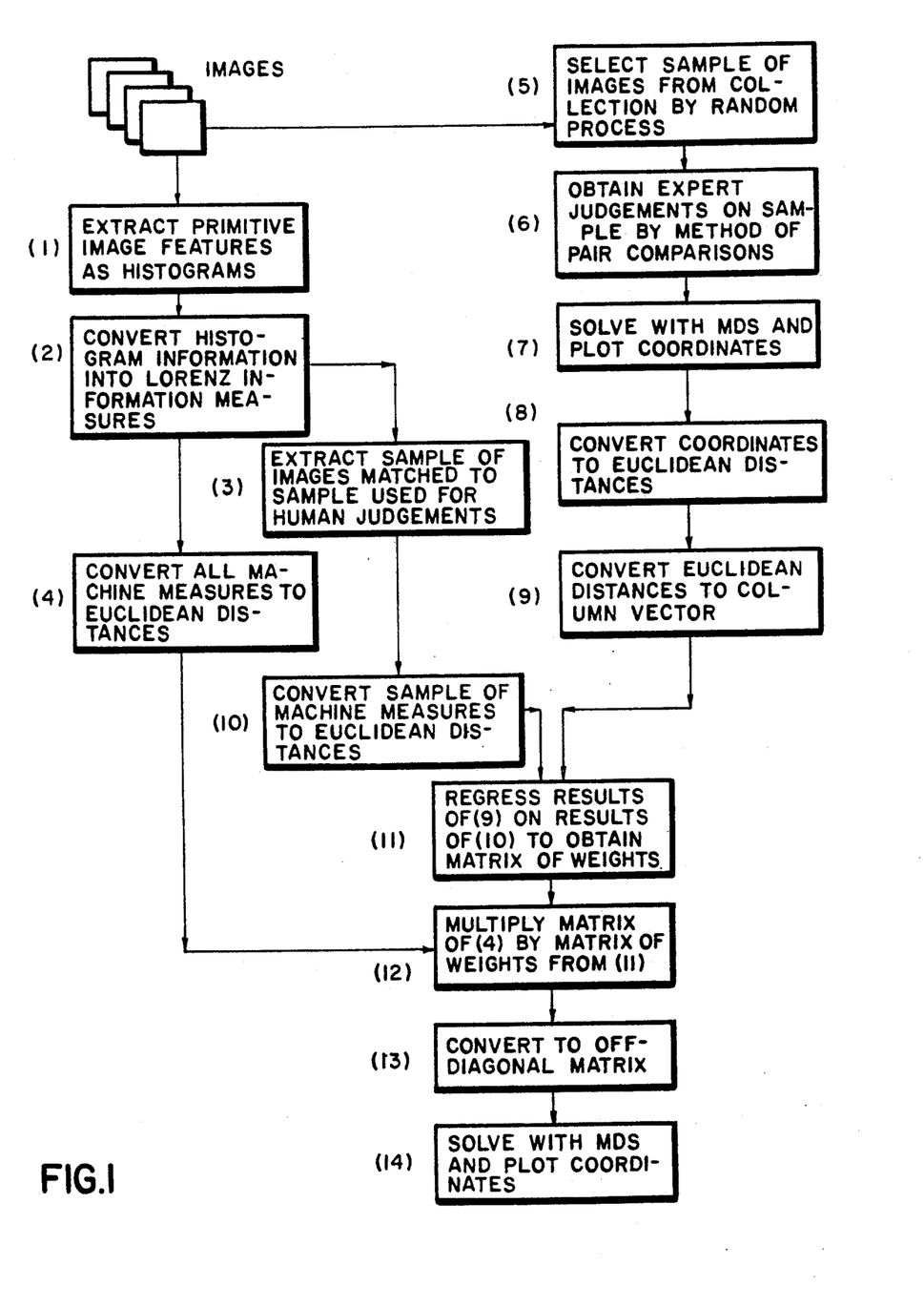
FIG. 1 is a detailed block diagram of the procedural steps of the Two Domain Method, according to the present invention, for classifying a collection of image patterns.

FIG. 1 illustrates the preferred embodiment of the Two Domain Method according to the present invention as applied to a collection of images. Each numbered block in this figure represents a separate and distinct step of this method.

The collection of images is initially sensed by machine and converted to a format—in particular, a signal S representing the patterns—which is useable by a computer. The signal S is then processed in block 1 to extract primitive image features as histograms of these features. By way of example and not limitation, the features may be grey level, edge intensity, edge slope, line length, line distance from the origin, and angle distance from the origin. Thereafter, in block 2, the histogram for each image is converted into Lorenz information measures. In block 3, the Lorenz information measures associated with those images which are used for the expert, human judgments are extracted from the group for later use.

Subsequently, in block 4, the Euclidean distances among all pairs of images are calculated over all Lorenz information measures to produce a matrix M of primitive machine image interpretations.

In block 5, a set of sample images is selected at random from the collection of images. In block 6, the sample images are compared, in pairs, by a human expert to determine the degree of dissimilarity of each pair. These expert judgments are then processed using conventional multi-dimensional scaling (MDS) techniques to produce a real valued ordering $\Phi$ of these images by their dissimilarity, as indicated in block 7. Thereafter, in block 8, the geometric representation produced by the MDS process is converted to Euclidean distances which, in turn, are converted, in block 9, to a column vector.

Thereafter, in block 10, the extracted sample of images, in Lorenz information measures, is converted to Euclidean distances which are regressed with the results of the conversion in block 9 to obtain a matrix of weights $\beta$, in block 11.

In block 12, the matrix M produced in block 4 is multiplied by the matrix of weights $\beta$ from block 11. The resulting vector is converted to an off-diagonal matrix in block 13 for submission to MDS in block 14. The result of this MDS is the final ordering $\Phi'$.

Application of the Two Domain Method to the Classification of Two Populations of Human Peripheral Blood Leukocytes As an example, the Two Domain Method according to the invention will be applied to a problem of discriminating two populations of microscopic images of circulating human white blood cells (leukocytes).

Specifically, the Two Domain Method has been tested for its power to discriminate two distinct patterns of human blood leukocyte distribution: An abnormal pattern associated with acute liver failure exhibiting abnormal circulating white blood cell frequency and distribution (Subject 1) and a normal pattern from a normal, healthy subject (Subject 2).

Circulating human leukocytes were separated by flotation from red blood cells by a standard flotation method, and uniform monolayer films prepared and cytochemically stained by a routine clinical laboratory automated instrument using hematoxylin and eosin dyes. The resulting slides therefore included all nucleated circulating white blood cells, predominately neutrophils, eosinophils, lymphocytes and monocytes, as well as platelets.

Eight representative sample fields were selected for each subject. A photographic recording was standardized using one continuous film strip of Kodak Ektachrome color reversal film rated at ASA 200. All slides were photographed at the same magnification. Effects of exposure variations and background density were tested in the Two Domain Method by recording each image at two different exposures. Sixteen Set A images were exposed at ASA 200, while sixteen Set B images were exposed at ASA 400. Samples used in the test thus consisted of sixteen images from each subject, at two levels of exposure, on the same photographic film strip.

The difference in exposure levels substantially alters the machine measurements of these images and is typical of problems that confound image pattern classification generally, in that "noise" introduced by one element or another distort the machine classification algorithms. The purpose of this application is thus to demonstrate that the Two Domain Method is sufficiently robust not only to classify properly Set A (by segregation in an n-dimensional space), but also to reduce or eliminate the noise artificially introduced by the difference in Set B film exposure levels.

Expert judgments of dissimilarities were made by an experienced pathologist (C.T.L.) primarily on the basis of the segmentation of leukocyte nuclei, and lymphocyte and monocyte shape and size. Other cell types present in the images were ignored for judgment purposes. Judgments were provided in a single session on slides 1-8 of Set A according to the procedure described above, and submitted (as are all datasets discussed herein) to the ALSCAL procedure in SAS, a common multi-dimensional scaling software package.

Figure 2:
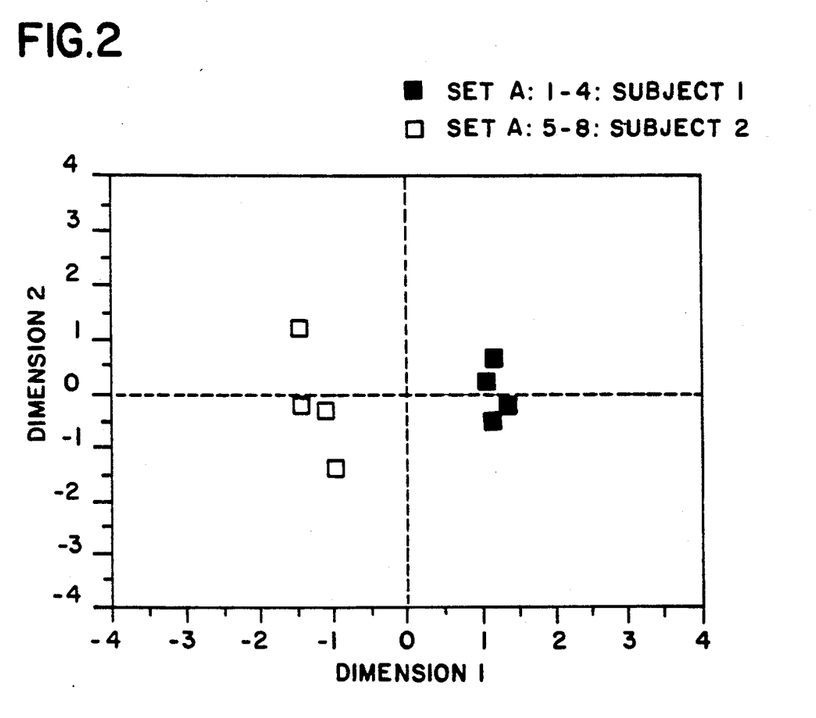
FIGS. 2 and 3 are multi-dimensional scaling (MDS ALSCAL) plots of the original human view of a sample of eight images (photographic slides) of peripheral white blood cells. The human judgments were collected through the method of paired comparisons, and show a clear separation between the slides from Subject 1 and Subject 2.
Figure 3:
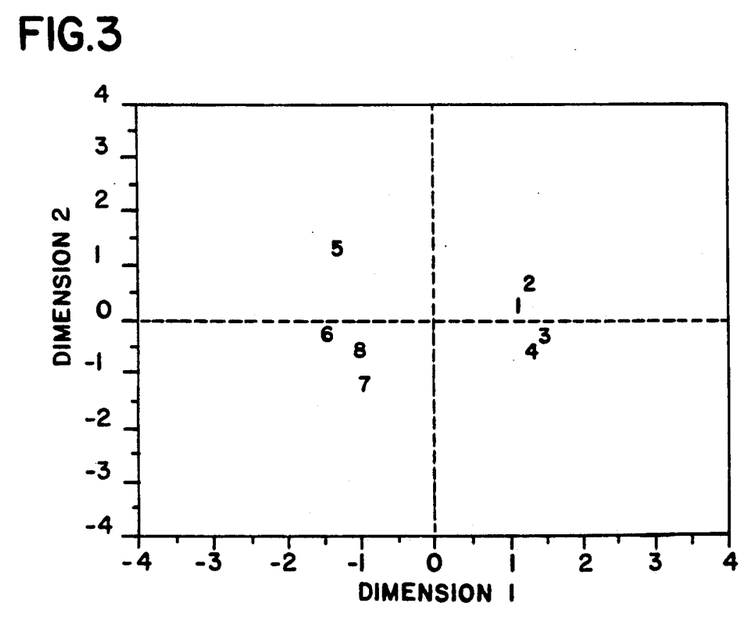
Figure 4:
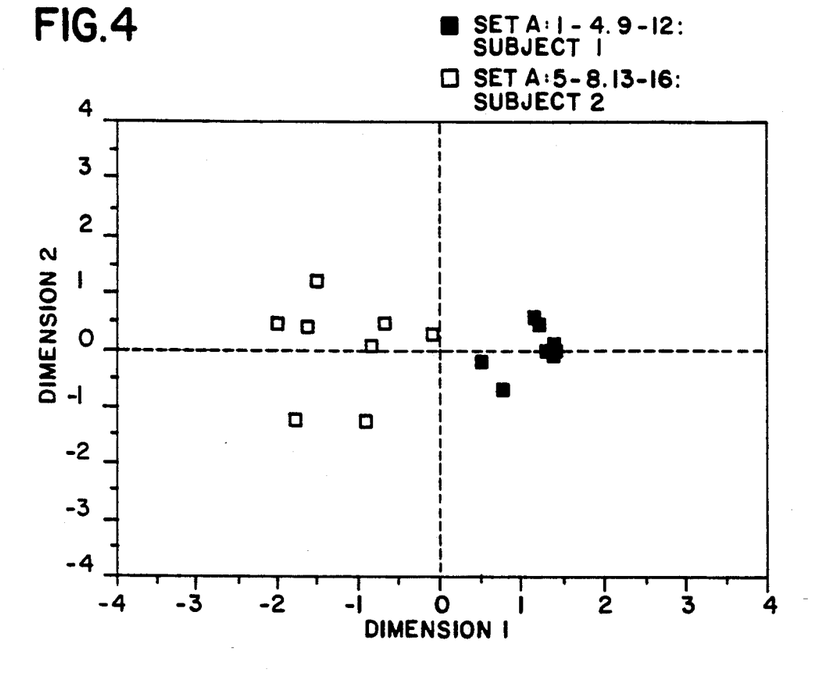
FIG. 4 is an MDS ALSCAL plot of the primitive machine views of a set A of sixteen slides (slides 1-16) from a photographic film, rated as ASA 200 and exposed at ASA 200, which includes both Subject 1 and Subject 2. This plot exhibits some natural clustering by machine features alone.
Figure 5:
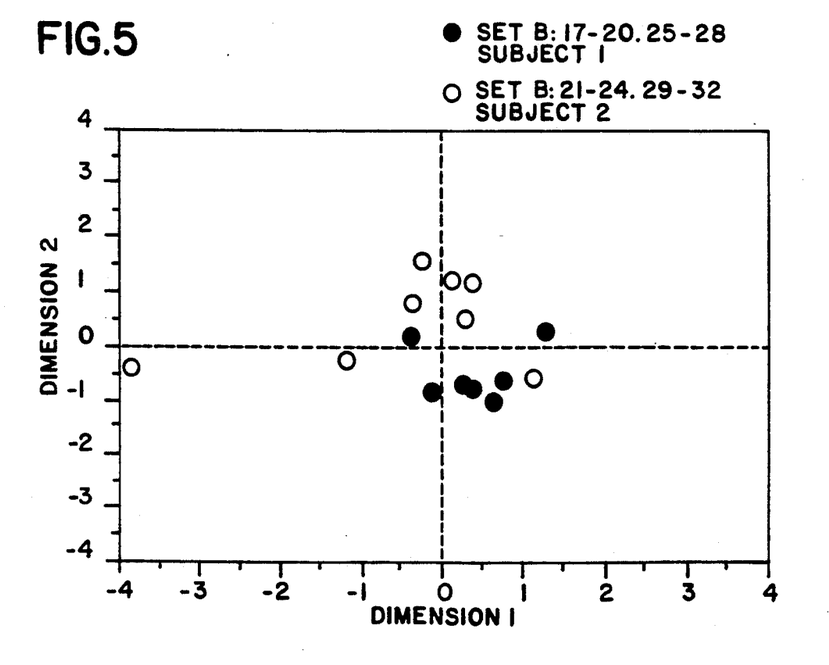
FIG. 5 is an MDS ALSCAL plot of the primitive machine views of a set B of sixteen slides (slides 17-32) from a photographic film, rated at ASA 200 but exposed at ASA 400, including both Subject 1 and Subject 2. This plot exhibits little machine differentiation between the two subjects.

FIGS. 2 and 3, which are MDS ALSCAL plots of this manual examination of slides 1-8, exhibit a strong separation between the cell populations of the two subjects. The primitive machine interpretations derived from both Set A and Set B, scaled by ALSCAL, appear in FIGS. 4 and 5, respectively. The images represented by datapoints in FIG. 4 appear to have some natural clustering tendency along the same lines as those provided directly by human judgments, probably due to the increased light levels in the images produced from Subject 1 and caused by the generally lower levels of white blood cells in the sample drawn from that subject. FIG. 5, on the other hand, derived from the deliberately overexposed images, reveals very little meaningful segregation.

Figure 6:
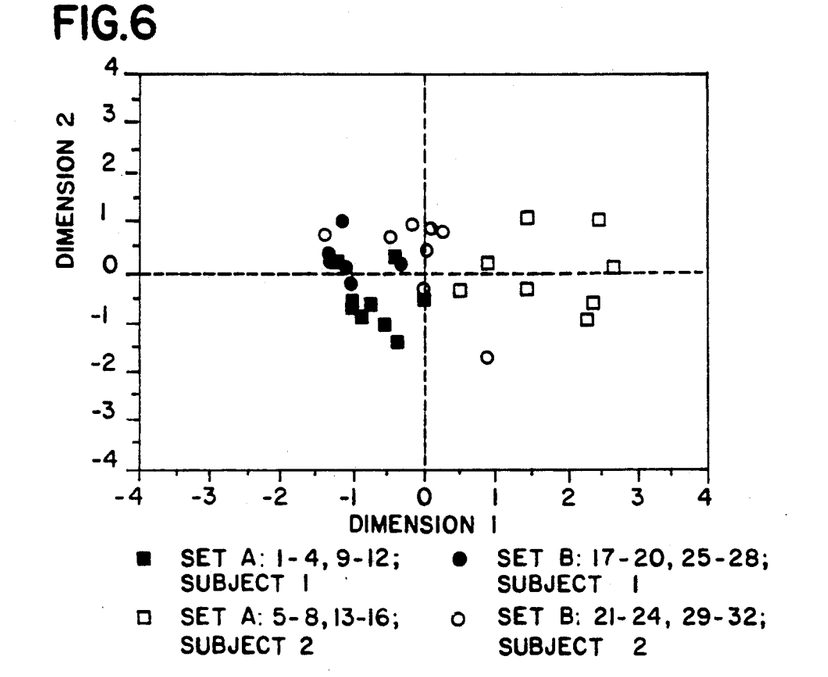
FIG. 6 is an MSD ALSCAL plot of both slide sets A and B and Subjects 1 and 2. It exhibits distortion of the natural clustering effect displayed in set A of FIG. 4 when set A and set B are combined.

FIG. 6 reveals the strong confounding effect of the Set B data when combined with Set A and scaled together. When the sets are combined, each item acts to influence the scale value of every other item, so that the pure machine view, or interpretation, of these images becomes extremely confused. There is, for example, some segregation of Subject 1 and Subject 2, but still much less than that appearing in the human classification of these images provided in FIG. 2.

Figure 7:
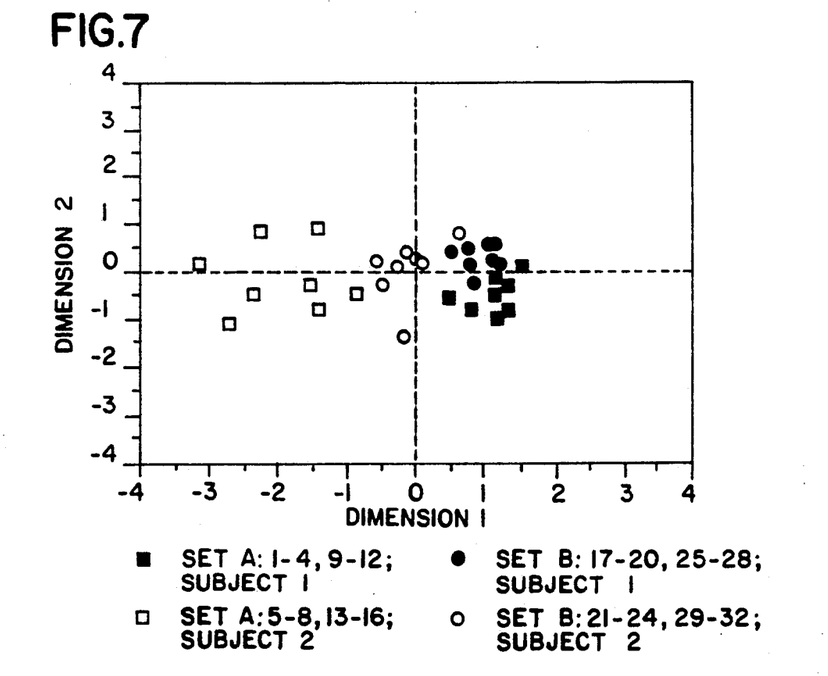
FIG. 7 is an MDS ALSCAL plot of slide sets A and B and Subjects 1 and 2. This plot exhibits the reordering of Subject 1 and Subject 2 classes when weighted by the human view displayed in FIG. 2.

FIG. 7 shows the effect of the Two Domain Method on the disordered data of FIG. 6. FIG. 7 was produced according to the procedures of FIG. 1 with the detailed calculations described below. In FIG. 7, Subject 1 and Subject 2 data are perfectly segregated for Set A and, with the exception of one image, also perfectly segregated for Set B. Clearly, the strong, confounding effect introduced by combining Set B with Set A images is eliminated.

Figure 8:
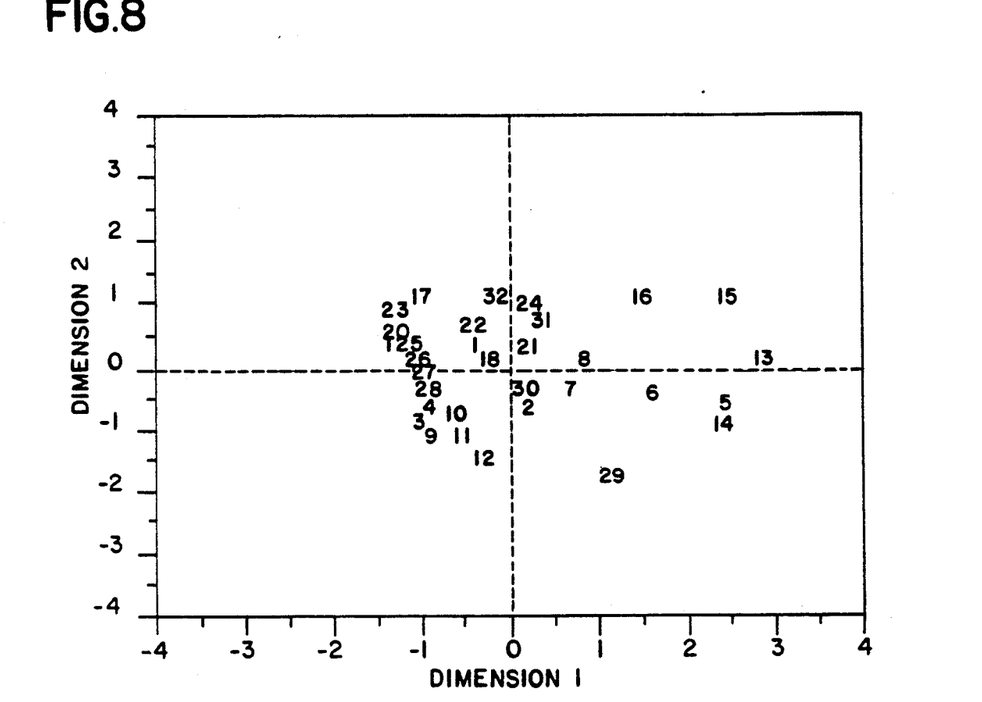
Figure 9:
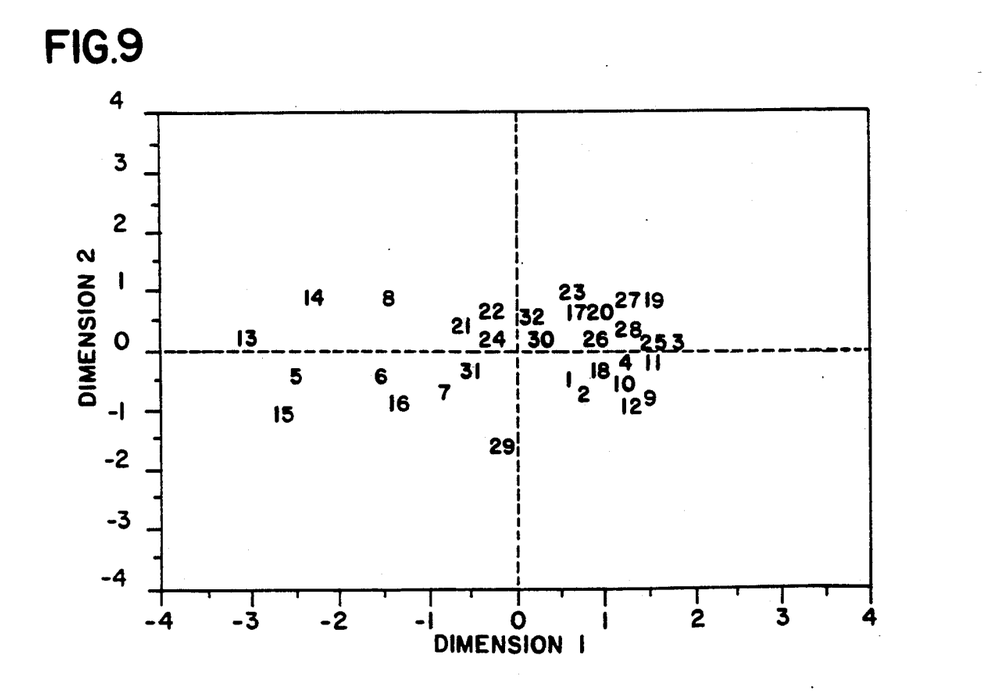

FIGS. 8 and 9 are MDS ALSCAL plots, in numbered display, of both the primitive and human weighted views of the thirty-two peripheral blood cell slides. FIG. 9 exhibits the substantial "learning" effect created by imposition of the human judgments on the machine interpretations.

Detailed Calculations

The calculations used to produce the plot of FIG. 7 will now be described in detail. First, the primitive machine measurements (Lorenz information measures) for images 17-24 corresponding to the human judgments rendered on Set A for images 1-8 were converted to six sets of squared Euclidean distances (one for each machine measurement) according to the following equation:

$$Q_k = (P_{ik} - P_{jk})^2; \quad 1 < j, \quad k = 1, 6 \tag{1}$$

Where,

Q is matrix of 28×6,
$Q_k$ is a column of matrix Q,
p is a matrix of 8×6,
$p_{ik}$ is the machine measurement k for image i, and
$p_{jk}$ is the machine measurement k for image j.

Since a column of Q contains the squared difference between all pairs of images on the corresponding machine measurements, there are $[n(n-1)]/2$ elements in each column, where n is the number of images.

Second, the squared Euclidean distances between all pairs of slides 1-8 of Set A, that is, Φ, were computed from the spatial coordinates of the MDS solution for the human judgments of FIG. 2 according to equation 2:

$$D = \sum_k (x_{ik} - x_{jk})^2, \quad i < j, \quad k = 1, r \tag{2}$$

where,

D is the square symmetric matrix,
$x_{ik}$ is the coordinate of image i on dimension k,
$x_{jk}$ is the coordinate of image j on dimension k, and
r is the number of dimensions in the solution.

Third, the square symmetric matrix was converted to a column vector containing the top off-diagonal elements (for convenience also denoted D) and regressed on the matrix Q of equation 1 to produce the vector of weights, β. Equation 3 is the multiple regression equation in standard form and equation 4 is the standard least squares solution.

$$D = Q\beta' \tag{3}$$

$$\beta = (Q'Q)^{-1}Q'D \tag{4}$$

Fourth, the procedure of equation 1 was applied to all machine data, images 1-32, denoted M, and multiplied by the vector of weights, β, or $$V = M\beta' \tag{5}$$

where,

V is the final vector converted to an off-diagonal matrix for submission to MDS, and
M is the 496×6 matrix from the procedure of equation 1.

V, submitted to MDS and scaled, thus results in Φ' as displayed in FIG. 7.

Conclusion

In conclusion, the Two Domain Method, as disclosed herein, is effective simply because it reduces the intense machine activity associated with pattern matching to the simple operations of ratio scale value relations. Moreover, the scaling theory underlying the method is easily transferable to operations involving classifications among higher dimensions. Indeed, multi-dimensional scaling has, for some time, been more often used to record human judgments in higher dimensions for a variety of marketing applications. P. E. Green and F. J. Carmone, "Multi-dimensional Scaling: An Introduction and Comparison of Nonmetric Unfolding Techniques," *Journal of Marketing Research*, Vol. 6, 1969, pgs. 330-41. Finally, by using replicated multi-dimensional scaling methods, the opinions of multiple experts (as opposed to the single expert used in this application) may be combined in the creation of Φ.

The Two Domain Method is also applicable to image classification systems that routinely use Bayesian methods. In this case, the operations of the Bayesian classifiers would use, as their inputs, the dissimilarity values output from multi-dimensional scaling matrix transforms, ignoring the plotted values that are derived from the dissimilarity values anyway. Along these same lines, the Two Domain Method may facilitate neural net pattern classification, both by making the net more efficient due to the reduction of information that must be submitted (dissimilarities or Euclidean distances rather than vectors of pixel values), and by the increased rigor of the training set expression that reduces noise when particular aspects of patterns are judged, rather than patterns as a whole.

Finally, the Two Domain Method may be used in the searching of large databases of images, where image representations are stored as feature components. In this application, the method would be applied to image classes iteratively, by segregating and mapping successively smaller classes of imagery. This application may be critical to locating desired sets of images that cannot be described linguistically due either to intellectual or economic constraints.

There has thus been shown and described a novel general method of pattern classification using the Two Domain Theory which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method for automatic classification of a collection C of patterns using the judgments of human experts on a plurality of sample patterns, said method comprising the steps of:
   (a) selecting a set of sample patterns;
   (b) manually comparing members of said set of sample patterns to determine the degree of dissimilarity of each member of said set with respect to other members of said set;
   (c) producing an ordering Φ of said members of said set by their degree of dissimilarity in an n-dimensional space by means of multi-dimensional scaling to produce a real-valued ordering Φ of said sample patterns;
   (d) sensing the collection C of patterns to produce a signal S representing said patterns;
   (e) processing the signal S to produce a plurality of machine derived signatures representing distributions of primitive features of interest;
   (f) calculating the spatial distance among pairs of said patterns from said machine derived signatures to produce a matrix M of interpoint distances; and
   (g) creating a mapping of the ordering Φ on the matrix M by multiple regression;
   whereby said collection of patterns is organized into sets of similar patterns.

2. The method defined in claim 1, wherein said patterns are images.

3. The method defined in claim 1, wherein said sample patterns are selected from said collection of patterns.

4. The method defined in claim 3, wherein said sample patterns are selected at random from said collection of patterns so as to be representative of said collection.

5. The method defined in claim 1, wherein each member of the set of sample patterns is manually compared as a pair with every other member of said set to determine the degree of dissimilarity of each pair.

6. The method defined in claim 5, wherein said comparing step includes the steps of manually marking a line, for each pair of sample patterns, which indicates, on an arbitrary scale from dissimilar to similar, the degree of dissimilarity of such pair; and sensing the line to produce a signal representative of the position of the mark on the line.

7. The method defined in claim 1, wherein said n-dimensional space is a Euclidean space.

8. The method defined in claim 1, wherein said step of sensing said collection C of patterns includes the step of digitizing each pattern and storing the digitized values.

9. The method defined in claim 1, wherein said signal S processing step includes the step of producing a histogram for each of said primitive features.

10. The method defined in claim 9, wherein said signal S processing step further includes the step of converting the feature histograms for each pattern into Lorenz information measures.

11. The method defined in claim 10, wherein said calculating step includes the step of calculating the Euclidean distance among pairs of said patterns over the Lorenz information measures to produce said matrix M.

12. The method defined in claim 11, wherein said step of creating a mapping includes the step of creating a linear mapping of the ordering $\Phi$ on the matrix M.

13. The method defined in claim 1, wherein said step of creating a mapping includes the steps of regressing the ordering $\Phi$ with the sample of matrix M corresponding to the sample manually compared to obtain a matrix of weights $\beta$ by multiple regression and multiplying the matrix M by the matrix $\Phi$.

14. The method defined in claim 13, further comprising the step of submitting the results of the matrix multiplication to multi-dimensional scaling to produce the final ordering $\Phi'$, consisting of patterns segregated into classes in an n-dimensional space.

15. A method for synthesizing human judgement measurements and machine derived measurements with respect to a collection C of patterns, said method comprising the steps of:

(a) selecting from the collection C of patterns a sample set comprising a plurality of sample patterns;

(b) forming pairs of patterns from said sample set by pairing each sample pattern with at least one other sample pattern;

(c) determining, using the subjective judgement of at least one human, a relative degree of dissimilarity between the patterns of each said pair;

(d) sensing the collection C of patterns to produce a signal S representing each pattern of said collection;

(e) extracting machine derived measurements of selected features from signal S for each pattern of collection C to create a set X of said machine derived feature measurements;

(f) selecting from the set X of machine derived feature measurements the subset Y of machine derived feature measurements corresponding to the set of sample patterns of step (a)

(g) processing the results of steps (c) and (f) to produce a matrix of weights relating the human judgement measurements with the machine derived feature measurements for the set of sample patterns; and (h) applying the weights from step (g) to the machine derived feature measurements for the set X, whereby, the human judgement measurements and the machine measurements are related for the entire collection C of patterns.

16. The method of claim 15, wherein said set of sample patterns are selected so as to be representative of said collection.

17. The method of claim 15, wherein the sensing step includes digitizing and storing the patterns.

18. The method of claim 15, wherein the machine derived features comprise one or more primitive measurements.

19. The method of claim 15 comprising the further step of producing an ordering consisting of patterns segregated into classes in a n-dimensional space.

* * * * *